(12) United States Patent
Adiga et al.

(10) Patent No.: US 11,258,794 B2
(45) Date of Patent: Feb. 22, 2022

(54) DEVICE CATEGORY BASED AUTHENTICATION

(71) Applicant: Hewlett Packard Enterprise Development LP, Houston, TX (US)

(72) Inventors: Badrish Havaralu Rama Chandra Adiga, Bangalore (IN); Balaji Sankaran, Bangalore (IN); Vinay Kumar Vishwakarma, Bangalore (IN); Krishna Mohan Elluru, Bangalore (IN); Shantha Kumara, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 449 days.

(21) Appl. No.: 16/243,700

(22) Filed: Jan. 9, 2019

(65) Prior Publication Data
US 2020/0220873 A1 Jul. 9, 2020

(51) Int. Cl.
*H04L 29/06* (2006.01)
*H04W 84/12* (2009.01)

(52) U.S. Cl.
CPC ............ *H04L 63/10* (2013.01); *H04W 84/12* (2013.01)

(58) Field of Classification Search
None
See application file for complete search history.

(56) References Cited

U.S. PATENT DOCUMENTS

| 8,341,717 | B1   | 12/2012 | Delker et al.                  |
|-----------|------|---------|--------------------------------|
| 8,522,318 | B2 * | 8/2013  | Vank ................. H04L 63/20 |
|           |      |         | 726/4                          |
| 8,799,997 | B2 * | 8/2014  | Spiers ............. H04L 63/0218 |
|           |      |         | 726/3                          |
| 8,893,258 | B2 * | 11/2014 | Rao ............... H04L 63/0892 |
|           |      |         | 726/14                         |
| 8,898,746 | B2 * | 11/2014 | Gregg ............ H04L 63/0853 |
|           |      |         | 726/4                          |
| 9,436,820 | B1 * | 9/2016  | Gleichauf ............ H04L 63/02 |
| 2005/0055573 | A1 * | 3/2005 | Smith ................ H04L 45/54 |
|           |      |         | 726/4                          |
| 2008/0189764 | A1 | 8/2008 | Gronholm et al.                |
| 2011/0004918 | A1 | 1/2011 | Chow et al.                    |
| 2013/0028245 | A1 * | 1/2013 | Oerton .............. H04L 67/42 |
|           |      |         | 370/338                        |

(Continued)

OTHER PUBLICATIONS

Li, Ying et al. A lightweight identity-based authentication protocol. 2013 IEEE International Conference on Signal Processing, Communication and Computing (ICSPCC 2013). https://ieeexplore.ieee.org/stamp/stamp.jsp?tp=&arnumber=6664134 (Year: 2013).*

(Continued)

*Primary Examiner* — Jeremiah L Avery

(57) ABSTRACT

Example approaches for authenticating a device are described. In an example, a category, from a plurality of categories, is identified for a device, based on data packets exchanged between the device and a network element. The category is indicative of operational capabilities of the device. Based on the category identified for the device, an authentication order for the device is determined. The authentication order is indicative of a sequence in which a set of authentication tests is to be executed for authentication of the device.

20 Claims, 5 Drawing Sheets

(56) References Cited

U.S. PATENT DOCUMENTS

2014/0282902 A1* 9/2014 Zou .................. H04L 63/08
726/4
2016/0352731 A1 12/2016 Mentze et al.

OTHER PUBLICATIONS

Daddala, Bhavana et al. Design and implementation of a customized encryption algorithm for authentication and secure communication between devices. 2017 IEEE National Aerospace and Electronics Conference (NAECON). https://ieeexplore.ieee.org/stamp/stamp.jsp?tp=&arnumber=8268781 (Year: 2017).*

Shahzad, Muhammad; Singh, Munindar P. Continuous Authentication and Authorization for the Internet of Things. IEEE Internet Computing, vol. 21, Issue: 2. https://ieeexplore.ieee.org/stamp/stamp.jsp?tp=&arnumber=7867716 (Year: 2017).*

Auto Configuration upon Aruba AP Detection, (Web Page), Retrieved Sep. 24, 2018, 6 Pgs.

* cited by examiner

DEVICE CATEGORY BASED AUTHENTICATION

BACKGROUND

In a network environment, network elements authenticate devices thereby enabling the devices to access data and resources in the network environment. Authentication of the devices may prevent misuse of the network environment by avoiding unauthorized access to the network environment and network-accessible resources. Authentication of the devices involves validation of different credentials, such as an assigned identifier (ID), a password, a device certificate or other authenticating information of the devices to allow or disallow access to the network environment. Authentication includes specifying access rights or privileges related to information security for the devices to control access to the network environment.

BRIEF DESCRIPTION OF DRAWINGS

The following detailed description references the drawings, wherein.

DETAILED DESCRIPTION

Figure 1:
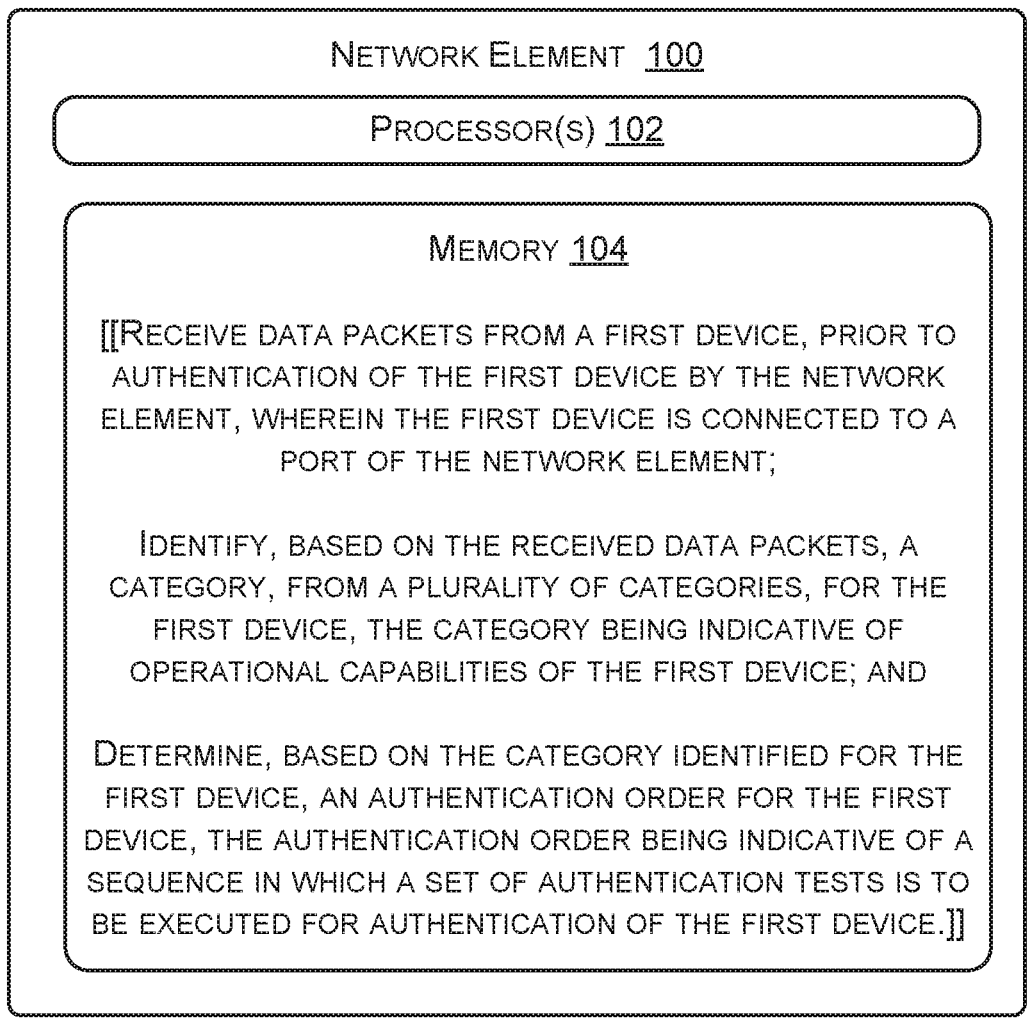
FIG. 1 illustrates a network element for authentication of devices, according to an example.

Authentication may be performed by different authentication mechanisms or tests. The authentication tests use a group of protocols and policies to validate different credentials of a device attempting to connect to a network element that controls access to a network. The network element is a device having capabilities to connect to a network and provide other devices access to the network. The network element has capabilities to implement network access control for managing access rights and privileges of devices requesting access to the network. Network access control includes approaches to computer security that unifies endpoint security (such as antivirus, host intrusion prevention, and vulnerability assessment), user or system authentication and network security enforcement. The network element may be a network node, such as a network endpoint in a Local Area Network (LAN). Examples of the network element include a switch, a bridge, a router, and a gateway, capable of processing computer readable instructions.

When a device attempts to connect to the network element, the network element generally performs multiple authentication tests in a predefined sequence, also called a default authentication order, to authenticate the device. The default authentication order defines a type-I authentication test and a type-II authentication test according to the sequence in which such tests are performed. The type-I authentication test refers to an authentication test which is employed in secure environments and may be a default choice of network administrators for secure environments. The type-II authentication test may be a less secure authentication test compared to the type-I authentication test and may be simpler in operation than the type-II authentication test. For authentication of the device as per the default authentication order, the type-I authentication test is executed first followed by the type-II authentication test. In an example, the type-I authentication test and the type-II authentication test may be an IEEE 802.1X based authentication test and a Media Access Control (MAC) based authentication test, respectively.

Devices, such as switches, network controllers, routers, bridges, and gateways, generally support the type-I authentication test. However, some devices, such as printers, personal computers, telephones, and Internet of Things (IoT) devices, may not be compatible with the type-I authentication test and may consequently not support the type-I authentication test. Though a device may not support the type-I authentication test, the network element, configured based on the default authentication order, repeatedly attempts to authenticate the device using the type-I authentication test for a predefined time period. If the repeated authentication attempts using the type-I authentication test are unsuccessful after the predefined time period is exhausted, the network element identifies that the type-I authentication test has failed for the device. After identifying that the type-I authentication test has failed, the network element performs the type-II authentication test to authenticate the device. Due to such failed authentication attempts for the predefined time period, authentication of devices which are incompatible with the type-I authentication test may consume processing resources of the device and the network element, may be time consuming and complex.

Further, a network administrator generally configures an authentication mode for each port of the network element depending on a type of a device which is to be connected to a respective port. The type of the device may be indicative of the functionalities of the device. The authentication mode is indicative of authentication policies for another device attempting a connection with the device connected to the respective port of the network element. In an example, if a client device, such as a phone, a personal computer, a printer, or an Internet of Things (IoT) device is to be connected to a port of the network element, the port may be configured in a client-based authentication mode. In the client-based authentication mode, each device attempting a connection to the client device is individually authenticated by the network element.

In an example, if another network element, such as a switch, a bridge, an access point, or a router, is to be connected to a port of the network element, the port is configured in a port-based authentication mode. In the port-based authentication mode, the other networking element, connected to the port, is authenticated by the network element, while authentication of devices attempting a connection with the other network element is handled by the other network element. Thus, configuring the authentication mode for a port depending on the type of device to be connected to the port, involves manual effort of the network administrator in configuring each port based on network topology.

Further, to enable network administrators to connect devices to a network element, physical ports of the network element are generally color-coded to indicate the type of the device to be connected to such physical ports. For example, ports of a network switch, configured in the client-based authentication mode, may be coated with blue color to indicate that a client device, such as, a printer, an Internet Protocol (IP) phone, or a personal computer is to be connected to the blue-colored ports. Similarly, ports of a network switch, configured in the port-based authentication mode, may be coated with yellow color to indicate that a network element, such as, a switch, a router, or a bridge is to be connected to the yellow colored ports. Based on the color code of the ports, the network administrator may connect the devices to the ports. However, coating of colors on the ports involves additional manufacturing steps and additional costs.

The present disclosure describes approaches in which an authentication order for authentication of a device is dynamically determined based on a category identified for the device attempting a connection with a network element. Since, the authentication order is dynamically determined based on the category, authentication of the device may be faster than authentication based on the default authentication order. Further, authentication mode for the device may also be determined based on the identified category, thereby allowing flexibly and dynamically configuring the authentication mode for the device.

The present disclosure describes example implementations of authentication of a device by a network element. In an example, the device attempts a connection with the network element to access a network, such as a Local Areas Network (LAN). The network element may be a network node, such as a communication endpoint of the LAN. The network element has capabilities to implement network access control protocols for authentication of the device attempting to access the network. In an example, a category, from a plurality of categories, is identified for the device, based on data packets exchanged between the device and the network element. The data packets may be exchanged between the device and the network element, prior to authentication of the device by the network element. The category is indicative of operational capabilities of the device. In an example, the operational capabilities may include information which indicate compatibility of the device with an authentication test and capabilities of the device to implement network access control protocols for authentication of other devices attempting a connection with the device.

Based on the category identified for the device, an authentication order for the device is determined. The authentication order is indicative of a sequence in which a set of authentication tests is to be executed for authentication of the device. In an example, the set of authentication tests may include the type-I authentication test, such as the IEEE 802.1X based authentication test, and the type-II authentication test, such as the MAC based authentication test. Depending on the category identified for the device, the sequence of authentication tests may be altered. In an example, when the category identified for the device indicates that the device has operational capabilities that support the type-I authentication test, the authentication order is set such that the type-I authentication test is executed first followed by the type-II authentication test. In another example, when the category identified for the device indicates that the device does not have operational capabilities that support the type-I authentication test, the authentication order is set such that the type-II authentication test is executed first followed by the type-I authentication test.

Since, the devices which do not support the type-I authentication test are authenticated based on the type-II authentication test first, the network element does not make failed authentication attempts using the type-I authentication test, and thereby the consumption of processing resources, time consumption and complexity in authentication of such devices may be reduced. Further, since the authentication mode of a port may also be dynamically determined based on the category identified for the device, the manual effort of the network administrator in configuring the authentication mode associated with a port may be eliminated or reduced. Also, dynamic determination of the authentication order and the authentication mode based on the identified category of the device, may facilitate in elimination of color-coded physical ports, thereby reducing manufacturing steps in coloring the ports and associated costs.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a network element 100 for authentication of devices, according to an example. The network element 100 has capabilities to implement network access control for managing access rights and privileges of devices requesting access to a network. Network access control includes approaches to computer security that unifies endpoint security (such as antivirus, host intrusion prevention, and vulnerability assessment), user or system authentication and network security enforcement. Examples of the network element 100 include a switch, a bridge, a router, and a gateway, capable of processing computer readable instructions. The network refers to a computer network having nodes which share resources of the network. The nodes are devices or data points in the network having a unique address of its own. In an example, devices attempting a connection with the network element 100 may be connected to a port of the network element 100. The port serves as an interface between the network element 100 and devices connecting to the network element 100. Examples of devices connecting to the network element 100 include telephones, desktop computers, laptops, printers, switches, bridges, routers, access points, and Internet of Things (IoT) devices.

The network element 100 includes a processor 102 and a memory 104 coupled to the processor 102. The functions of the various elements shown in the FIG. 1, including any functional blocks labeled as "processor(s)", may be provided through the use of dedicated hardware as well as hardware capable of executing software. When provided by the processor 102, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other custom-built hardware, may also be included.

The memory 104 stores instructions executable by the processor 102. The instructions when executed by the processor 102 cause the processor 102 to receive data packets from a device, prior to authentication of the device by the network element 100. In an example, the device is connected to a port of the network element 100 through a wired Ethernet connection. In an example, the data packets exchanged between the device and the network element 100 include information advertised by the device about its identity, capabilities, and neighboring devices on a Local Area Network. In an example, the data packets are exchanged between the device and the network element 100 through one of Link Layer Discovery Protocol (LLDP) and Dynamic Host Configuration Protocol (DHCP).

Further, the instructions when executed by the processor 102 cause the processor 102 to identify a category, from a plurality of categories, for the device attempting a connection with the network element 100. The category identified for the device is indicative of operational capabilities of the device. In an example, the operational capabilities may include information which indicate compatibility of the device with an authentication test and capabilities of the device to implement network access control protocols for authentication of other devices attempting a connection with the device. Examples of the plurality of categories include a first category and a second category. In an example the first category may be associated with devices which are compatible with an IEEE 802.1X based authentication test and is configured to implement network access control protocols for authentication of other devices attempting a connection with the device. The second category may be associated with devices which are incompatible with the IEEE 802.1X based authentication test and are not capable of implementing network access control protocols for authentication of other devices attempting a connection with the device.

The instructions stored in the memory 104 are executable by the processor 102 to further determine, based on the category identified for the device, an authentication order for the device. The authentication order is indicative of a sequence in which a set of authentication tests is to be executed for authentication of the device. In an example, the device connecting to the network element 100 is referred to as a first device and another device connecting to the first device may be referred to as a second device.

Since, according to the present disclosure, the authentication order is determined based on the identified category of the device, therefore, the default authentication order may not be applied for all devices. Rather, the authentication order may be altered based on the operational capability of the device, as indicated by the identified category, which may reduce the processing resources consumed, time consumed, and complexity involved in authentication of the device.

Figure 2:
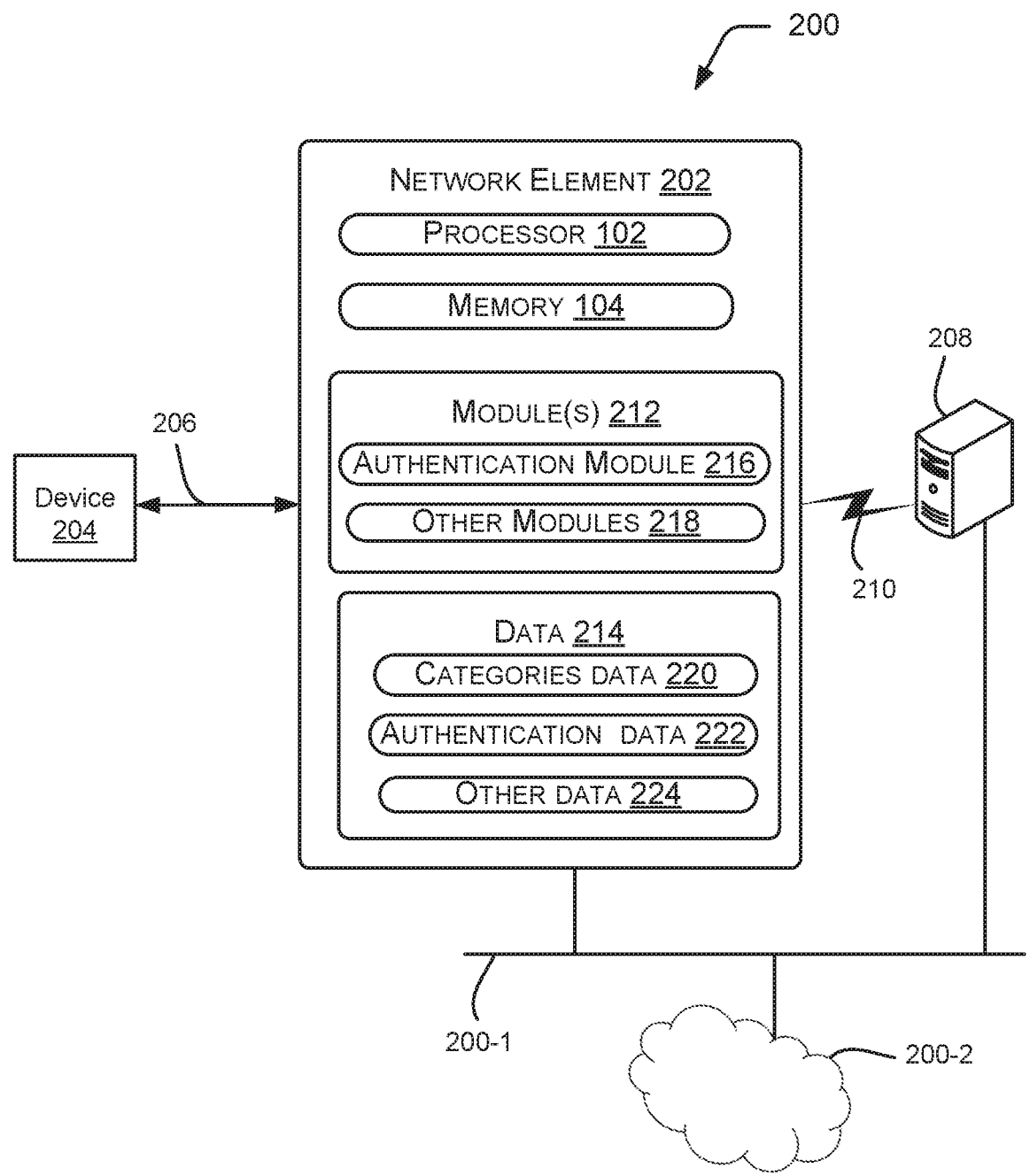
FIG. 2 illustrates a network environment for authentication of devices, according to an example.

FIG. 2 illustrates a network environment 200 for authentication of devices, according to an example. In an example, the network environment 200 is a part of a campus area network or corporate area network (CAN). The network environment 200 may include a collection of multiple Local Area Networks (LANs). As shown in FIG. 2, the network environment 200 includes a LAN network 200-1. The network environment 200 includes a network element 202 which serves as an access point to the LAN network 200-1. The LAN network 200-1 also includes other LAN accessible resources 200-2 connected to the LAN network 200-1. In an example, the network element 202 may be a switch, a bridge, a gateway, or a router to which devices trying to gain access to the LAN network 200-1 may connect.

In the network environment 200, a device 204 attempts a connection with the network element 202 to access resources of the LAN network 200-1. In an example, the device 204 may be referred to as a supplicant which is a computing entity at one end of a point-to-point LAN segment that seeks to be authenticated by an authenticator attached to the other end of that link. The device 204 has computing capabilities and capabilities to connect to a network. The device 204 is connected to the network element 202 through a wired connection 206. In an example, the device 204 may connect to a port (not shown) of the network element 202 through an Ethernet cable.

The network environment 200 further includes an authentication server 208 connected to the LAN 200-1. In an example, the authentication server 208 functions as a host based on Remote Authentication Dial-In User Service (RADIUS) and Extensible Authentication Protocol (EAP) protocols. Although in FIG. 2, the authentication server 208 is illustrated as a separate entity, in an example, the functionalities of the authentication server may be executed by the hardware of the network element 202. The authentication server 208 enables authentication of the device 204.

The network element 202 may communicate with the authentication server 208 over a communication link 210. The communication link 210 may be a part of wireless or a wired network, or a combination thereof. The communication link 210 may be a collection of individual networks, interconnected with each other and functioning as a single large network (e.g., the internet or an intranet). Examples of such individual networks include LAN network, Wireless LAN network, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication link 210 includes various network entities, such as transceivers, gateways, and routers.

The network element 202 further includes a processor 102 coupled to a memory 104. The processor 102 may be implemented as microprocessors, microcomputers, microcontrollers, digital signal processors, central processing units, state machines, logic circuitries, and any devices that manipulate signals based on operational instructions. Among other capabilities, the processor 102 is configured to fetch and execute computer-readable instructions stored in the memory 104.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other custom-built hardware, may also be included.

The memory 104 may include any computer-readable medium known in the art including, for example, volatile memory (e.g., RAM), and/or non-volatile memory (e.g., EPROM, flash memory, etc.). Module(s) 212 and data 214 may reside in the memory 104. The module(s) 212 can be implemented as instructions stored on a computer readable medium and executable by a processor, and/or as hardware. The module(s) 212 include routines, programs, components, data structures, and the like, which perform particular tasks or implement particular abstract data types.

The module(s) 212 include an authentication module 216 which corresponds to instructions stored on a computer readable medium and executable by a processor to identify a category of the device 204 and determine the authentication order and the authentication mode, based on the identified category. The module(s) 212 also comprise other modules 218 that supplement applications on the network element 202, for example, modules of an operating system.

The data 214 serves, amongst other things, as a repository for storing data that may be fetched, processed, received, or generated by the module(s) 212. The data 214 includes categories data 220 that stores data relating to categories identified for devices attempting to connect to the network element 202. The categories data 220 may include a grouping of devices in a first category and a second category. A device grouped under the first category is generally compatible with the type-I authentication test, such as an IEEE 802.1X based authentication test and possesses capabilities to implement network access control protocols for authentication of other devices attempting a connection with the device. A device grouped under the second category is generally incompatible with the type-I authentication test, such as the IEEE 802.1X based authentication test and does not possess capabilities to implement network access control protocols for authentication of other devices attempting a connection with the device. The data 214 also includes authentication data 222 which stores data relating to an authentication order and authentication mode determined based on the category of the device 204. The data 214 also comprises other data 224 corresponding to the other modules 218.

In operation, when the network element 202 detects that the device 204 is connected to a port of the network element 202 for a first time, the port is enabled and set to an unauthorized state. In the unauthorized state, exchange of data traffic based on authentication protocols, such as 802.1X based authentication protocols or MAC based authentication protocols, is allowed to pass through the port, whereas, other traffic, such as traffic based on the Internet Protocol (IP), Transmission Control Protocol (TCP), and User Datagram Protocol (UDP) is dropped.

To initiate authentication, the authentication module 216 periodically transmits authentication requests to a specific address in a local network segment of the network element 202. The device 204 reads information at the specific address, and on receipt of an authentication request, the device 204 sends data packets including information about its identity, capabilities, and neighboring devices, to the network element 202. In an example, the information may be included in data packets exchanged between the device 204 and the network element 202 through one of Link Layer Discovery Protocol (LLDP) and Dynamic Host Configuration Protocol (DHCP).

In an example, the data packets exchanged between the device 204 and the network element 202 may include a functionality information of the device 204. In an example, the functionality information may include attributes which indicate whether, the device 204 is a repeater, a bridge, a wireless access point, a router, a telephone, a printer, a personal computer, and a modem.

The authentication module 216 extracts the functionality information from the data packets exchanged between the device 204 and the network element 202. In an example, the data packets may be parsed to extract the functionality information of the device 204. The authentication module 216 then compares the extracted functionality information with functionality information associated with each of the plurality of categories stored in a first database, to identify the category for the device 204.

In an example, the functionality information, as received by the network element 202, may be illustrated as below:

Functionalities: 0*00XX

............... .0=Repeater Not capable
.............. .1.=Bridge: Capable
............ .0..=Wireless Access point: Not capable
............ .0. . . =Router: Not capable
........... .0. . . . .=Telephone: Not capable
.......... .0. . . . .=Modem: Not capable In the above illustration, 0*00XX is the address of the device 204 attempting to be authenticated. The above information may be processed by the authentication module 216 to determine that the device, in the above illustration, is a bridge.

In an example, the first database includes a predefined mapping between the attributes of the functionality information and a category. For example, in the first database, a repeater, a bridge, a wireless access point, a router, a modem, a gateway, and a switch are mapped to a first category; and a printer, a telephone, a personal computer, and an IoT device are mapped to a second category. If the extracted attributes of the functionality information match with that of a repeater, a bridge, a wireless access point, a router, a modem, a gateway, and a switch, then based on the comparison with the first database, the first category is identified for the device 204. If the extracted attributes of the functionality information match with that of a printer, a telephone, a personal computer, and an IoT device, then based on the comparison with the first database, the second category is identified for the device 204. In an example, the first database is predefined and stored in the memory 104 of the network element 202.

Thus, the first category is identified for devices which are generally compatible with a type-I authentication test, such as an IEEE 802.1X based authentication test and which possess capabilities to implement network access control protocols for authentication of other devices attempting a connection with the device. Whereas, a second category is identified for devices which are generally incompatible with the type-I authentication test, such as the IEEE 802.1X based authentication test and which do not possess capabilities to implement network access control protocols for authentication of other devices attempting a connection with the device.

In another example, the data packets exchanged between the device 204 and the network element 202 may include type-length-value (TLV) information. The TLV information is indicative of a specific sequence of TLV based messages exchanged between the device 204 and the network element 202. In an example, TLV information exchanged between a telephone and the network element 202 may include a specific sequence of TLV frames in which the telephone shares the phone IP, device capabilities, and voice Virtual LAN (VLAN) information with the network element 202. The authentication module 216 extracts the TLV information from the data packets exchanged between the device 204 and the network element 202. The authentication module 216 may parse the data packets to extract the TLV information.

The authentication module 216 then compares the extracted TLV information with TLV information associated with each of the plurality of categories stored in a second database, to identify the category. In an example, the second database includes a predefined mapping between TLV information and a respective category. For example, in the second database, TLV information associated with one of a repeater, a bridge, a wireless access point, a router, a modem, a gateway, and a switch is mapped to the first category; and TLV information associated with one of a printer, a telephone, a personal computer, and an IoT device is mapped to the second category.

If the extracted TLV information of the device 204 matches with that of a repeater, a bridge, a wireless access point, a router, a modem, a gateway, or a switch, then based on the comparison with the second database, the first category is identified for the device 204. If the extracted TLV information of the device 204 matches with that of a printer, a telephone, a personal computer, or an IoT device, then based on the comparison with the second database, the second category is identified for the device 204. In an example, the second database is predefined and stored in the memory 104 of the network element 202.

In another example, the data packets exchanged between the device 204 and the network element 202 may include a set of unique identifiers. In an example, the set of unique identifiers are advertised by the device 204 over a Dynamic Host Configuration Protocol (DHCP). The set of unique identifiers include at least one of a network address, a hardware address, a host name, a Universally Unique Identifier (UUID) based identifier, and a Globally Unique Identifier (QUID) based identifier for the device 204. The network address may be an Internet Protocol (IP) address or a Fully Qualified Domain Name (FQDN) and the hardware address may be a MAC address of the device 204.

The authentication module 216 extracts the set of unique identifiers from the data packets exchanged between the device 204 and the network element 202. The authentication module 216 may parse the data packets to extract the set of unique identifiers.

The authentication module 216 then compares the extracted set of unique identifiers with a set of unique identifiers associated with each of the plurality of categories stored in a third database, to identify the category. In an example, the third database includes a predefined mapping between the set of unique identifiers and a respective category. For example, in the third database, a set of unique identifiers associated with one of a repeater, a bridge, a wireless access point, a router, a modem, a gateway, and a switch is mapped to the first category; and a set of unique identifiers associated with one of a printer, a telephone, a personal computer, and an IoT device is mapped to the second category.

If the extracted set of unique identifiers of the device 204 matches with that of a repeater, a bridge, a wireless access point, a router, a modem, a gateway, and a switch, then based on the comparison with the third database, the first category is identified for the device 204. If the extracted set of unique identifiers of the device 204 matches with that of a printer, a telephone, a personal computer, and an IoT device, then based on the comparison with the third database, the second category is identified for the device 204. In an example, the third database is predefined and stored in the memory 104 of the network element 202.

When the first category is identified for the device 204, the authentication module 216 sets or configures a first authentication order for the device 204. In the first authentication order, the device 204 is authenticated based on an IEEE 802.1X based authentication test followed by a MAC based authentication test. In an example, the first authentication order is the default authentication order of the network element 202.

When the second category is identified for the device 204, the authentication module 216 sets or configures a second authentication order for the device 204. In the second authentication order, the device 204 is authenticated based on a MAC based authentication test followed by an IEEE 802.1X based authentication test. In an example, the second authentication order is a modified authentication order different from the default authentication order of the network element 202. Thus, the authentication order of the device 204 is determined based on the category identified for the device 204. After the authentication order is determined, authentication tests may be performed for the device 204 according to the determined authentication order.

Further, based on the identified category for the device 204, an authentication mode may be determined for the device 204. The authentication mode is associated with the port of the network element 202 to which the device 204 is connected. The authentication mode is indicative of authentication policies for another device (not shown) attempting a connection with the device 204.

The device 204 is referred to as a first device 204 and the device attempting the connection with the first device 204 is referred to as a second device (not shown). In an example, when the first category is identified for the first device 204, the authentication module 216 sets or configures the first device 204 to be authenticated in a port mode. In the port mode of authentication, authentication policies of the second device are determined by the first device 204. In the port mode, the first device 204 may implement network access control protocols on the second device attempting to connect to the first device.

When the second category is identified for the first device 204, the authentication module 216 sets or configures the first device 204 to be authenticated in a client mode. In the client mode of authentication, authentication policies of the second device are determined by the network element 202. In the client mode, the network element 202 may implement network access control protocols on the second device attempting to connect to the first device 204.

Figure 3:
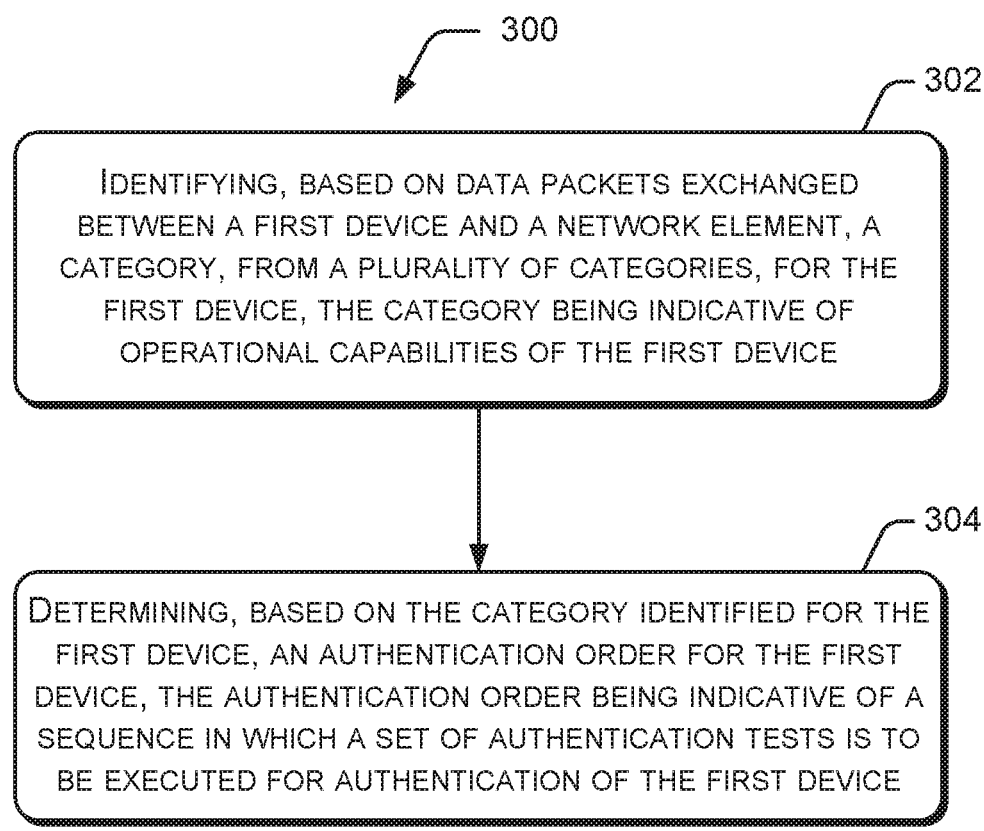
FIG. 3 illustrates a method for authentication of devices, according to an example.

FIG. 3 illustrates a method 300 for authentication of devices, according to an example. The method 300 facilitates authentication of devices by a network element, such as the network element 100 or 202. The method 300 can be implemented by processing resource(s) or computing device(s) through any suitable hardware, a non-transitory machine readable medium, or combination thereof. In an example, the method 300 may be performed by an authentication module, such as the authentication module 216 which includes instructions stored on a medium and executable by a processing resource, such as the processor 102, of a network element, such as the network element 100 or 202. Further, although the method 300 is described in context of the network element 100 or 202, other suitable systems may be used for execution of the method 300. It may be understood that processes involved in the method 300 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

Referring to FIG. 3, at block 302, a category, from a plurality of categories, is identified for a device attempting to be authenticated by a network element. The category is identified based on data packets exchanged between a first device and the network element. The network element has capabilities to implement network access control for managing access rights and privileges of devices requesting access to a network. Network access control includes approaches to computer security that unifies endpoint security (such as antivirus, host intrusion prevention, and vulnerability assessment), user or system authentication and network security enforcement. Examples of the network element 100 include a switch, a bridge, a router, and a gateway, capable of processing computer readable instructions. In an example, the device is connected to a port of the network element through a wired Ethernet connection. In an example, the data packets exchanged between the device and the network element include information advertised by the device about its identity, capabilities, and neighboring devices on a Local Area Network. In an example, the data packets are exchanged between the device and the network element through one of Link Layer Discovery Protocol (LLDP) and Dynamic Host Configuration Protocol (DHCP).

The category identified for the device is indicative of operational capabilities of the device. In an example, the operational capabilities may include information which indicate compatibility of the device with an authentication test and capabilities of the device to implement network access control protocols for authentication of other devices attempting a connection with the device.

At block 304, an authentication order for the device is determined based on the identified category. The authentication order is indicative of a sequence in which a set of authentication tests is to be executed for authentication of the first device.

Figure 4:
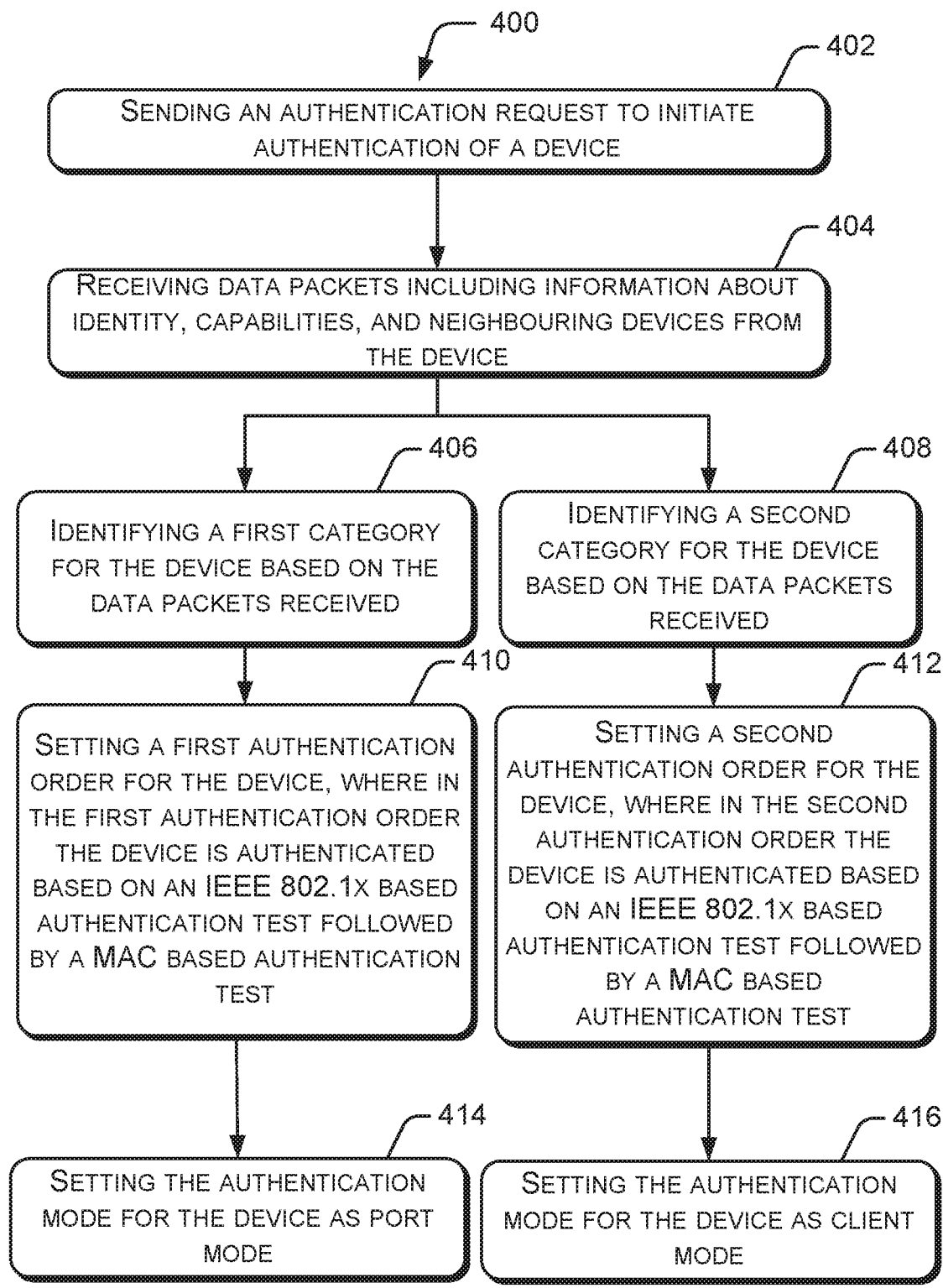
FIG. 4 illustrates another method for authentication of devices, according to an example.

FIG. 4 illustrates a method 400 for authentication of devices, according to an example. The method 400 facilitates authentication of devices by a network element, such as the network element 100 or 202. The method 400 can be implemented by processing resource(s) or computing device(s) through any suitable hardware, a non-transitory machine readable medium, or combination thereof. In an example, the method 400 may be performed by an authentication module, such as the authentication module 216 which includes instructions stored on a medium and executable by a processing resource, such as the processor 102, of a network element, such as the network element 100 or 202. Further, although the method 400 is described in context of the network element 100 or 202, other suitable systems may be used for execution of the method 400. It may be understood that processes involved in the method 400 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

A device attempting to access a LAN network is connected to a port of the network element which serves as a communication endpoint for the LAN network. When the network element detects that the device is connected, the port is enabled and set to an unauthorized state. In the unauthorized state, exchange of data traffic based on authentication protocols, such as 802.1X based authentication protocols or MAC based authentication protocols, is allowed to pass through the port, whereas, other traffic, such as traffic based on the Internet Protocol (IP), Transmission Control Protocol (TCP), and User Datagram Protocol (UDP) is dropped.

Referring to FIG. 4, at block 402, to initiate authentication, the network element transmits an authentication request. The device attempting to be authenticated by the network element, on receipt of the authentication request, sends data packets including information about its identity, capabilities, and neighboring devices, which are received by the network element, at block 404. In an example, the information may be included in data packets exchanged between the device 204 and the network element 202 through one of Link Layer Discovery Protocol (LLDP) and Dynamic Host Configuration Protocol (DHCP).

In an example, the data packets received by the network element from the device may include a functionality information of the device. In an example, the functionality information may include attributes which indicate whether, the device is a repeater, a bridge, a wireless access point, a router, a telephone, a printer, a personal computer, and a modem.

The functionality information may be extracted from the data packets received by the network element from the device. The extracted functionality information may be compared with functionality information associated with each of the plurality of categories stored in a firstdatabase, to identify the category for the device.

In an example, the first database includes a predefined mapping between the attributes of the functionality information and a category. For example, in the first database, a repeater, a bridge, a wireless access point, a router, a modem, a gateway, and a switch are mapped to a first category; and a printer, a telephone, a personal computer, and an IoT device are mapped to a second category. If the extracted attributes of the functionality information match with that of a repeater, a bridge, a wireless access point, a router, a modem, a gateway, and a switch, then based on the comparison with the first database, the first category is identified for the device. If the extracted attributes of the functionality information match with that of a printer, a telephone, a personal computer, and an IoT device, then based on the comparison with the first database, the second category is identified for the device. In an example, the first database is predefined and stored in the memory of the network element.

Thus, the first category is identified for devices which are generally compatible with a type-I authentication test, such as an IEEE 802.1X based authentication test and which possess capabilities to implement network access control protocols for authentication of other devices attempting a connection with the device. Whereas, a second category is identified for devices which are generally incompatible with the type-I authentication test, such as the IEEE 802.1X based authentication test and which do not possess capabilities to implement network access control protocols for authentication of other devices attempting a connection with the device. Thus, at block 406, a first category is identified the device based on the data packets received. Similarly, based on the data packets received, a second category is identified for the device, at block 408.

In another example, the data packets received by the network element from the device may include type-length-value (TLV) information. The TLV information is indicative of a specific sequence of TLV based messages exchanged between the device and the network element. In an example, the TLV information exchanged between a telephone and the network element may include a specific sequence of TLV frames in which the telephone shares the phone IP, device capabilities, and voice Virtual LAN (ULAN) information with the network element. The TLV information may be extracted from the data packets received by the network element from the device.

The extracted TLV information is then compared with TLV information associated with each of the plurality of categories stored in a second database, to identify the category. In an example, the second database includes a predefined mapping between TLV information and a respective category. For example, in the second database, TLV information associated with one of a repeater, a bridge, a wireless access point, a router, a modem, a gateway, and a switch is mapped to the first category; and TLV information associated with one of a printer, a telephone, a personal computer, and an IoT device is mapped to the second category.

If the extracted TLV information of the device matches with that of a repeater, a bridge, a wireless access point, a router, a modem, a gateway, or a switch, then based on the comparison with the second database, the first category is identified for the device. If the extracted TLV information of the device matches with that of a printer, a telephone, a personal computer, or an IoT device, then based on the comparison with the second database, the second category is identified for the device. In an example, the second database is predefined and stored in the memory of the network element.

In another example, the data packets received by the network element from the device may include a set of unique identifiers. In an example, the set of unique identifiers are advertised by the device over a Dynamic Host Configuration Protocol (DHCP). The set of unique identifiers include at least one of a network address, a hardware address, a host name, a Universally Unique Identifier (UUID) based identifier, and a Globally Unique Identifier (QUID) based identifier for the device.

The set of unique identifiers may be extracted from the data packets received by the network element. The extracted set of unique identifiers is then compared with a set of unique identifiers associated with each of the plurality of categories stored in a third database, to identify the category. In an example, the third database includes a predefined mapping between the set of unique identifiers and a respective category. For example, in the third database, a set of unique identifiers associated with one of a repeater, a bridge, a wireless access point, a router, a modem, a gateway, and a switch is mapped to the first category; and a set of unique identifiers associated with one of a printer, a telephone, a personal computer, and an IoT device is mapped to the second category.

If the extracted set of unique identifiers of the device matches with that of a repeater, a bridge, a wireless access point, a router, a modem, a gateway, and a switch, then based on the comparison with the third database, the first category is identified for the device. If the extracted set of unique identifiers of the device matches with that of a printer, a telephone, a personal computer, and an IoT device, then based on the comparison with the third database, the second category is identified for the device. In an example, the third database is predefined and stored in the memory of the network element.

When the first category is identified for the device, a first authentication order is set or configured for the device, at block 410. In the first authentication order, the device is authenticated based on an IEEE 802.1X based authentication test followed by a MAC based authentication test. In an example, the first authentication order is the default authentication order of the network element.

When the second category is identified for the device, a second authentication order is set or configured for the device, at block 412. In the second authentication order, the device is authenticated based on a MAC based authentication test followed by an IEEE 802.1X based authentication test. In an example, the second authentication order is a modified authentication order different from the default authentication order of the network element. Thus, the authentication order of the device is determined based on the category identified for the device. After the authentication order is determined, authentication tests may be performed for the device according to the determined authentication order.

Further, based on the identified category for the device, an authentication mode may be determined for the device. The authentication mode is associated with the port of the network element to which the device is connected. The authentication mode is indicative of authentication policies for another device attempting a connection with the device.

The device connected to the port of the network element is referred to as a first device and the device attempting the connection with the first device is referred to as a second device. When the first category is identified for the first device, the authentication mode for the first device is set or configured to be as port mode, at block 414. In the port mode of authentication, authentication policies of the second device are determined by the first device. In the port mode, the first device may implement network access control protocols on the second device attempting to connect to the first device.

When the second category is identified for the first device, the authentication mode for the first device is set or configured to be as client mode, at block 416. In the client mode of authentication, authentication policies of the second device are determined by the network element. In the client mode, the network element may implement network access control protocols on the second device attempting to connect to the first device.

Figure 5:
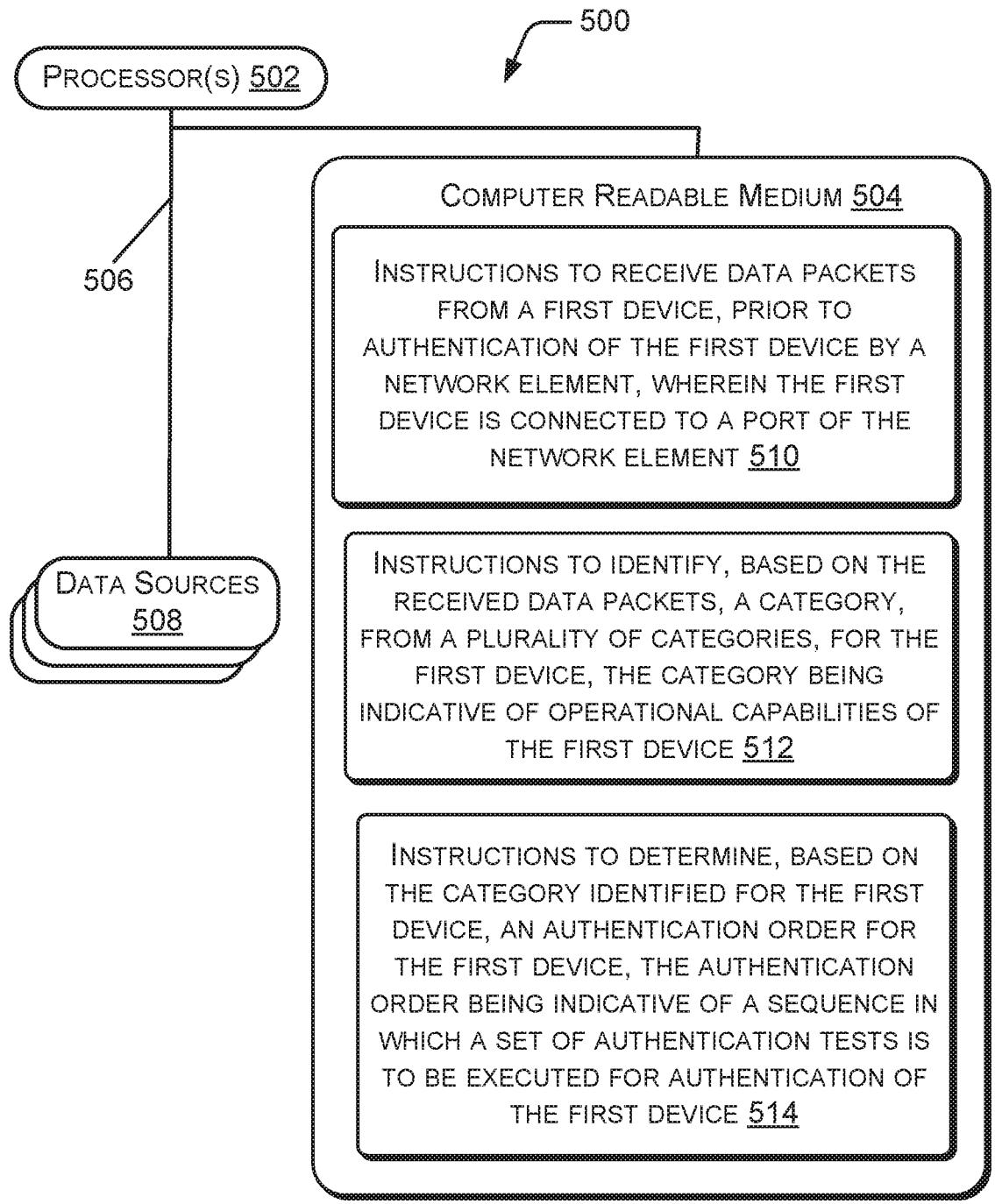
FIG. 5 illustrates a system environment implementing a non-transitory computer readable medium for authentication of devices, according to an example.

FIG. 5 illustrates a system environment 500 implementing a non-transitory computer readable medium for authentication of a device, according to an example. In an example, the system environment 500 includes processor(s) 502 communicatively coupled to a non-transitory computer readable medium 504 through a communication link 506. In an example, the system environment 500 may be a computing system, such as the network element 100 or 202. In an example, the processor(s) 502 may have one or more processing resources for fetching and executing computer-readable instructions from the non-transitory computer readable medium 504.

The non-transitory computer readable medium 504 can be, for example, an internal memory device or an external memory device. In an example implementation, the communication link 506 may be a direct communication link, such as any memory read/write interface.

The processor(s) 502 and the non-transitory computer readable medium 504 may also be communicatively coupled to data sources 508 over the network. The data sources 508 can include, for example, memory of the system, such as the network element 100 or 202.

In an example implementation, the non-transitory computer readable medium 504 includes a set of computer readable instructions which can be accessed by the processor(s) 502 through the communication link 506 and subsequently executed to perform acts for authentication of a device.

Referring to FIG. 5, in an example, the non-transitory computer readable medium 504 includes instructions 510 that cause the processor(s) 502 to receive data packets from a device, prior to authentication of the device by the system environment, such as the network element 100 or 202. The device is connected to a port of the network element.

The non-transitory computer readable medium 504 includes instructions 512 that cause the processor(s) 502 to identify, based on the received data packets, a category, from a plurality of categories, for the device. The category being indicative of operational capabilities of the device. The operational capabilities may include information which indicate compatibility of the device with an authentication test and capabilities of the device to implement network access control protocols for authentication of other devices attempting a connection with the device.

In an example, the non-transitory computer readable medium 504 may include instructions that cause the processor(s) 502 to extract functionality information from the received data packets and compare the extracted functionality information with functionality information associated with each of the plurality of categories stored in a first database, to identify the category.

In another example, the non-transitory computer readable medium 504 may include instructions that cause the processor(s) 502 to extract Type-length-value (TLV) information from the received data packets and compare the extracted TLV information with TLV information associated with each of the plurality of categories stored in a second database, to identify the category.

The non-transitory computer readable medium 504 includes instructions 514 that cause the processor(s) 502 to determine, based on the category identified for the device, an authentication order for the device, the authentication order being indicative of a sequence in which a set of authentication tests is to be executed for authentication of the device.

In an example, the non-transitory computer readable medium 504 includes instructions that cause the processor(s) 502 to determine, based on the identified category for the device, an authentication mode for the device. The authentication mode is indicative of authentication policies for another device, referred to as a second device, attempting a connection with the device connected to the port of the network element, referred to as a first device. The authentication mode is associated with a port of the network element to which the first device is connected.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
   identifying, based on data packets exchanged between a first device and a network element, a category, from a plurality of categories, for the first device, the category being indicative of operational capabilities of the first device; and
   determining, based on the category identified for the first device, an authentication order for the first device, the authentication order being indicative of a sequence in which a set of authentication tests is to be executed for authentication of the first device.

2. The method as claimed in claim 1, further comprising, determining, based on the identified category for the first device, an authentication mode for the first device, wherein the authentication mode is indicative of authentication policies for a second device attempting a connection with the first device, and wherein the authentication mode is associated with a port of the network element to which the first device is connected.

3. The method as claimed in claim 1, wherein identifying the category comprises:
   extracting functionality information from the data packets exchanged between the first device and the network element; and
   comparing the functionality information with functionality information associated with each of the plurality of categories stored in a first database, to identify the category.

4. The method as claimed in claim 1, wherein identifying the category comprises:
   extracting Type-length-value (TLV) information from the data packets exchanged between the first device and the network element; and
   comparing the extracted TLV information with TLV information associated with each of the plurality of categories stored in a second database, to identify the category.

5. The method as claimed in claim 1, wherein identifying the category comprises:
   extracting a set of unique identifiers from the data packets exchanged between the first device and the network element, the set of unique identifiers including at least one of a network address, a hardware address, a host name, a Universally Unique Identifier (UUID) based identifier, and a Globally Unquiet Identifier (GUID) based identifier for the first device; and
   comparing the extracted set of unique identifiers with a set of unique identifiers associated with each of the plurality of categories stored in a third database, to identify the category.

6. The method as claimed in claim 1, wherein determining the authentication order for the first device comprises:
   setting a first authentication order for the first device when a first category is identified for the first device, wherein in the first authentication order the first device is authenticated based on an IEEE 802.1X based authentication test followed by a MAC based authentication test.

7. The method as claimed in claim 1, wherein determining the authentication order for the first device comprises:
   setting a second authentication order for the first device when a second category is identified for the first device, wherein in the second authentication order the first device is authenticated based on the MAC based authentication test followed by the IEEE 802.1X based authentication test.

8. The method as claimed in claim 1, wherein the data packets are exchanged between the first device and the network element through one of Link Layer Discovery Protocol (LLDP) and Dynamic Host Configuration Protocol (DHCP).

9. The method as claimed in claim 1, wherein the plurality of categories comprises:
   a first category, wherein the first category is associated with devices which are compatible with an IEEE 802.1X based authentication test and is configured to implement network access control protocols; and a second category, wherein the second category is associated with devices which are incompatible with the IEEE 802.1X based authentication test.

10. A network element comprising:
a processor; and
a memory coupled to the processor, the memory storing instructions executable by the processor to:
receive data packets from a first device, prior to authentication of the first device by the network element, wherein the first device is connected to a port of the network element;
identify, based on the received data packets, a category, from a plurality of categories, for the first device, the category being indicative of operational capabilities of the first device; and
determine, based on the category identified for the first device, an authentication order for the first device, the authentication order being indicative of a sequence in which a set of authentication tests is to be executed for authentication of the first device.

11. The network element as claimed in claim 10, wherein the memory stores instructions executable by the processor to further,
determine, based on the identified category for the first device, an authentication mode for the first device, wherein the authentication mode is indicative of authentication policies for a second device attempting a connection with the first device, and wherein the authentication mode is associated with a port of the network element to which the first device is connected.

12. The network element as claimed in claim 10, wherein to identify the category, the memory stores instructions executable by the processor to further:
extract functionality information from the received data packets; and
compare the extracted functionality information with functionality information associated with each of the plurality of categories stored in a first database, to identify the category.

13. The network element as claimed in claim 10, wherein to identify the category, the memory stores instructions executable by the processor to further:
extract Type-length-value (TLV) information from the received data packets; and
compare the extracted TLV information with TLV information associated with each of the plurality of categories stored in a second database, to identify the category.

14. The network element as claimed in claim 10, wherein to identify the category, the memory stores instructions executable by the processor to further:
extract a set of unique identifiers from the received data packets, the set of unique identifiers including at least one of a network address, a hardware address, a host name, a Universally Unique Identifier (UUID) based identifier, and a Globally Unique Identifier (GUID) based identifier for the first device; and
compare the extracted set of unique identifiers with a set of unique identifiers associated with each of the plurality of categories stored in a third database, to identify the category.

15. The network element as claimed in claim 10, wherein to determine the category, the memory stores instructions executable by the processor to further:
set a first authentication order for the first device when a first category is identified for the first device, wherein in the first authentication order the first device is authenticated based on a IEEE 802.1X based authentication test followed by a Media Access Control (MAC) based authentication test.

16. The network element as claimed in claim 10, wherein to determine the category, the memory stores instructions executable by the processor to further:
set a second authentication order for the first device when a second category is identified for the first device, wherein in the second authentication order the first device is authenticated based on the MAC based authentication test followed by the IEEE 802.1X based authentication test.

17. The network element as claimed in claim 10, wherein the data packets are received by the network element from the first device through one of Link Layer Discovery Protocol (LLDP) and Dynamic Host Configuration Protocol (DHCP).

18. A non-transitory computer-readable medium comprising computer-readable instructions, the instructions when executed by a processor, cause the processor to:
receive data packets from a first device, prior to authentication of the first device by a network element, wherein the first device is connected to a port of the network element;
identify, based on the received data packets, a category, from a plurality of categories, for the first device, the category being indicative of operational capabilities of the first device; and
determine, based on the category identified for the first device, an authentication order for the first device, the authentication order being indicative of a sequence in which a set of authentication tests is to be executed for authentication of the first device.

19. The non-transitory computer-readable medium as claimed in claim 17, wherein the instructions when executed by the processor, further cause the processor to,
determine, based on the identified category for the first device, an authentication mode for the first device, wherein the authentication mode is indicative of authentication policies for a second device attempting a connection with the first device, and wherein the authentication mode is associated with a port of the network element to which the first device is connected.

20. The non-transitory computer-readable medium s claimed in claim 17, wherein the instructions, to identify the category, when executed by the processor, further cause the processor to:
extract functionality information from the received data packets; and
compare the extracted functionality information with functionality information associated with each of the plurality of categories stored in a first database, to identify the category.

* * * * *